United States Patent
Yang et al.

(10) Patent No.: US 10,365,831 B2
(45) Date of Patent: Jul. 30, 2019

(54) AUTOMATED TIERING SYSTEM AND AUTOMATED TIERING METHOD

(71) Applicant: QNAP SYSTEMS, INC., New Taipei (TW)

(72) Inventors: Teng-Feng Yang, New Taipei (TW); Chung-Chih Huang, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 0 days.

(21) Appl. No.: 15/823,617

(22) Filed: Nov. 28, 2017

(65) Prior Publication Data
US 2019/0102085 A1    Apr. 4, 2019

(30) Foreign Application Priority Data
Sep. 30, 2017 (TW) .............................. 106133863 A

(51) Int. Cl.
*G06F 3/06* (2006.01)
*G05B 17/02* (2006.01)

(52) U.S. Cl.
CPC ............ *G06F 3/061* (2013.01); *G05B 17/02* (2013.01); *G06F 3/0614* (2013.01); *G06F 3/0631* (2013.01); *G06F 3/0647* (2013.01); *G06F 3/0683* (2013.01)

(58) Field of Classification Search
CPC .......... G06F 3/06; G06F 3/061; G06F 3/0614; G06F 3/0647; G06F 3/0631

USPC ....................................................... 711/165
See application file for complete search history.

(56) References Cited

U.S. PATENT DOCUMENTS

| | | | | |
|---|---|---|---|---|
| 8,972,694 | B1 * | 3/2015 | Dolan | G06F 13/28 711/170 |
| 2008/0263089 | A1 * | 10/2008 | Cousins | G06F 11/2069 |
| 2014/0101379 | A1 * | 4/2014 | Tomlin | G06F 3/0608 711/103 |
| 2017/0177222 | A1 * | 6/2017 | Singh | G06F 3/061 |

* cited by examiner

*Primary Examiner* — Pierre Miche Bataille
(74) *Attorney, Agent, or Firm* — JCIPRNET

(57) ABSTRACT

An automated tiering system and an automated tiering method are provided. The system includes a controller and multiple storage apparatuses that are layered into at least two tiers according to performance. In the method, an algorithm analyzer corresponding to each of multiple system configurations is executed to analyze data blocks in each storage apparatus to determine a target block of each data block after relocation and generate an estimated data allocation map. Then, a simulation engine is executed to classify the target blocks in the data allocation map according to a usage frequency of each target block so as to generate an exploitation map, and evaluate all of the exploitation maps to find the system configuration that raises the most performance as a best configuration. Finally, a data migrator is executed to migrate the data blocks in the storage apparatus according to the best configuration.

14 Claims, 5 Drawing Sheets

SSD tier
| | # | * | # |
|---|---|---|---|
| * | | | |

42

SAS tier
| ¥ | % | $ | & |
|---|---|---|---|
| & | % | ¥ | $ |

HDD tier
| ◎ | ◇ | ※ | ◇ |
|---|---|---|---|
| ※ | ☆ | ◎ | ☆ |

SSD tier
| | # | * | # |
|---|---|---|---|
| * | | | |

44

SAS tier
| ◎ | ◎ | ※ | ※ |
|---|---|---|---|
| ☆ | ☆ | ◇ | ◇ |

HDD tier
| ¥ | ¥ | & | & |
|---|---|---|---|
| % | % | $ | $ |

AUTOMATED TIERING SYSTEM AND AUTOMATED TIERING METHOD

CROSS-REFERENCE TO RELATED APPLICATION

This application claims the priority benefit of Taiwan application serial no. 106133863, filed on Sep. 30, 2017. The entirety of the above-mentioned patent application is hereby incorporated by reference herein and made a part of this specification.

BACKGROUND OF THE INVENTION

1. Field of the Invention

The invention relates to a storage method and a storage apparatus, and particularly relates to an automated tiering system and an automated tiering method.

2. Description of Related Art

Regarding the data relocation function of an auto-tiering system, the result of relocation cannot be predicted in advance but can only be learned by actually performing a data relocation process. If more than one configuration candidates are applicable in the auto-tiering system, the traditional process is to repetitively apply each of the configurations in data relocation, wait for the completion of data relocation to learn the performance raised with the configuration, and apply the next configuration and repeat the same steps. The steps keep repeating until the performance raises brought by all the configuration candidates are known, and then the best configuration is chosen.

However, performing data relocation may be time-consuming. For example, it may take hours or even days for data relocation. The repetitive try-and-error processes for figuring out the best solution not only make data relocation inefficient but also affect the system performance.

SUMMARY OF THE INVENTION

The invention provides an automated tiering system and an automated tiering method capable of avoiding time-consuming data relocation by finding out the best system configuration and migrating data accordingly.

An embodiment of the invention provides an automated tiering method. The automated tiering method is adapted for a storage system having a plurality of storage apparatuses layered into at least two tiers and a controller. The method includes steps as follows: choosing one of a plurality of system configurations applied for a data relocation function by the controller; executing an algorithm analyzer corresponding to the chosen system configuration, analyzing a plurality of data blocks in each of the storage apparatuses to determine a target block of each of the data blocks after relocation, and generating an estimated data allocation map based on the determined target blocks by the controller; executing a simulation engine by the controller to classify the target blocks in the data allocation map based on usage frequency, so as to generate an exploitation map; repeating the steps by the controller to generate the data allocation map and the exploitation map corresponding to each of the system configurations; evaluating the exploitation maps by the controller to find out the system configuration raising the most performance as a best configuration; and executing a data migrator by the controller to migrate the data blocks in the storage apparatuses based on the best configuration.

According to an embodiment of the invention, the step of determining the target block of each of the data blocks after relocation includes tier-promoting or tier-demoting the respective data blocks to the target blocks, wherein the tier after migration of the respective data blocks includes an adjacent tier or a non-adjacent tier.

According to an embodiment of the invention, the method further includes when the storage system is accessed, executing each of the algorithm analyzers by the controller to record a required input/output (I/O) characteristic, and analyzing the data blocks of each of the storage apparatuses by using the input/output characteristic, wherein the input/output characteristic includes one of the numbers of accessed times, read times, write times, random access input/output times, sequential access input/output times, and times of newly allocating a data block, or a combination thereof.

According to an embodiment of the invention, the step of executing the simulation engine by the controller to classify the target blocks in the data allocation map based on the usage frequency to generate the exploitation map includes: determining a class of the target block based on the usage frequency of each of the target blocks; and constructing the exploitation map based on the classes of the respective target blocks and locations of the respective target blocks in the respective tiers.

According to an embodiment of the invention, the step of evaluating the exploitation maps by the controller to find out the best configuration of the system configurations includes: finding out the target blocks in the tier with the best performance for each of the exploitation maps, and calculating a proportion of a number of the target blocks whose usage frequency of the class is greater than a predetermined frequency with respect to a number of all of the target blocks; and choosing the system configuration corresponding to the exploitation map with the highest proportion as the best configuration.

According to an embodiment of the invention, the step of evaluating the exploitation maps by the controller to find out the best configuration of the system configurations includes: assigning a corresponding score based on the usage frequency of each of the target blocks and importance of data stored in each of the target blocks; calculating a total of the scores of the target blocks in the tier with the best performance for each of the exploitation maps; and choosing the system configuration corresponding to the exploitation map with the highest total of the scores as the best configuration.

According to an embodiment of the invention, the step of evaluating the exploitation maps by the controller to find out the best configuration of the system configurations includes: comparing an allocation of the target blocks of each of the exploitation maps with a predetermined target allocation to find out the exploitation map matching the predetermined target allocation and adopting the system configuration corresponding to the exploitation map as the best configuration, wherein the predetermined target allocation includes a maximum throughput allocation or a tier-averaged allocation.

An automated tiering system according to an embodiment of the invention includes a plurality of storage apparatuses, a storage device, and a controller. The storage apparatuses are layered into at least two tiers based on performance. The storage device stores a plurality of modules. The controller is coupled to each of the storage apparatuses and the storage device, and configured to load and execute the modules. The modules include a plurality of algorithm analyzers, a simulation engine, and a data migrator. The algorithm analyzers respectively correspond to a plurality of system configurations applied for a data relocation function and are configured to analyze a plurality of data blocks in each of the storage apparatuses to determine a target block of each of the data blocks after relocation and generate an estimated data allocation map based on the determined target blocks. The simulation engine classifies the target blocks in the data allocation map generated by each of the algorithm analyzers to generate an exploitation map, and evaluates the exploitation map corresponding to each of the system configurations to determine a best configuration of the system configurations. The data migrator migrates the data blocks of the storage apparatuses based on the best configuration determined by the simulation engine.

Based on the above, in the automated tiering system and the automated tiering method according to the embodiments of the invention, the algorithms of different system configurations are used to simulate the results of data relocation, and the exploitation maps are constructed based on the locations where the data blocks are arranged in the results of simulation. Accordingly, the algorithm capable of raising the most performance is found through evaluation, and then the configuration corresponding to the algorithm is chosen and provided to the data migrator for data relocation. Accordingly, the time required for data relocation may be reduced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 4A to 4C are examples of exploitation maps according to an embodiment of the invention.

DESCRIPTION OF THE EMBODIMENTS

Figure 1:
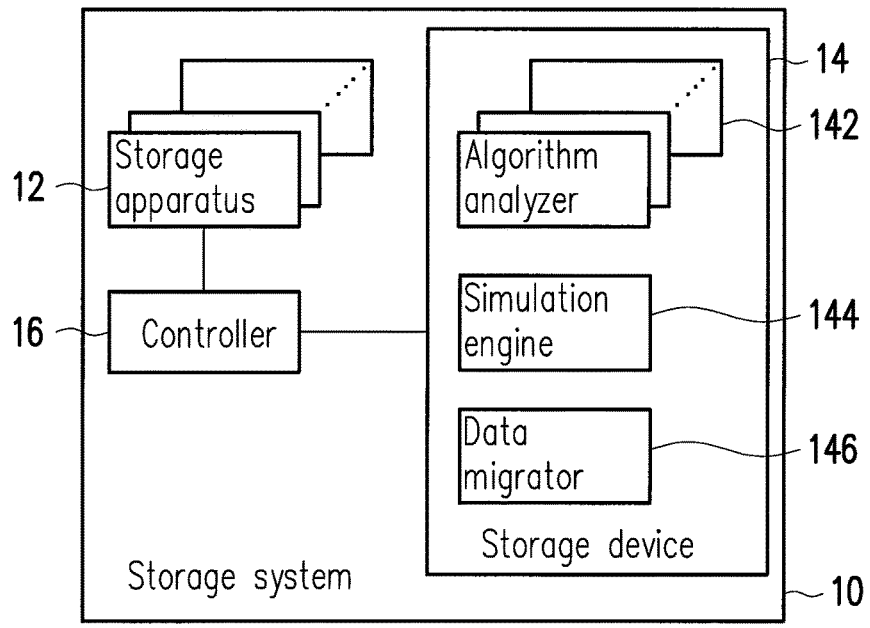
FIG. 1 is a block diagram illustrating an automated tiering system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the invention, algorithm analyzers corresponding to different system configurations respectively record required I/O characteristics when a storage system is accessed. After a simulation process is initiated, the algorithm analyzers may analyze all the data blocks based on the previously collected data, so as to determine target blocks for relocation of the data blocks and generate new data allocation maps. Based on the data allocation maps, the simulation engine may compute exploitation maps of the allocation maps and evaluate all the exploitation maps to determine an algorithm raising the most performance as the best system configuration. Then, the determined configuration is provided to a data migrator to start a data relocation optimizing process. Accordingly, the embodiments of the invention are able to find out the best system configuration in advance and thereby optimize the performance of tiered data storage while avoiding consuming a significant amount of time for data relocation.

FIG. 1 is a block diagram illustrating an automated tiering system according to an embodiment of the invention. Referring to FIG. 1, an automated tiering system 10 of the embodiment is a network attached storage (NAS) server having a computing capability and a network accessibility, for example. Alternatively, the automated tiering system 10 may also be other expanded storage devices, such as a file server, a database server, an application server, a work station, or a personal computer, for example. The automated storage system 10 includes a plurality of storage apparatuses 12, a storage device 14, and a controller 16. Functions of these components are described as follows.

For example, the storage apparatus 12 is a solid state drive (SSD) or a hard disk drive (HDD) adopting the advanced technology attachment (ATA) interface, the serial advanced technology attachment (SATA) interface, the small computer system interface (SCSI), the serial attached small computer system interface (SAS), or the like. The solid state drive has the advantage of high throughput and low delay, and is thus suitable for applications requiring high performance and stable transmission. The traditional hard disk drive is cheaper and may store a great amount of data. The storage system 10 of the embodiment adopts an automated tiering technique. The plurality of storage apparatuses 12 are layered into at least two tiers based on performance. For example, the tiers may include a solid state drive tier (SSD tier) and a hard disk drive tier (HDD tier) or include a solid state drive tier (SSD tier), a serial attached small computer system interface drive tier (SAS tier), and a hard disk drive tier (HDD tier). With these tiers, the storage system 10 is able to provide the high speed of the solid state drive and the storage capacity of the hard disk drive at the same time.

The storage device 14 may be any kind of fixed or mobile random access memory, read-only memory, flash memory, hardware, similar components, or a combination thereof, for example. In the embodiment, the storage device 14 is configured to record a plurality of software modules, such as a plurality of algorithm analyzers 142, a simulation engine 144, and a data migrator 146. In addition, the software modules are computer programs stored in the storage device 14, for example.

The controller 16 is a central processing unit (CPU), or other general-purpose or specific-purpose programmable microprocessors, a digital signal processor (DSP), a programmable controller, an application specific integrated circuit (ASIC), a programmable logic device, other similar apparatuses, or a combination thereof, for example. The controller 16 is coupled to the respective storage apparatuses 12 and the storage device 14, and may load the computer programs of the algorithm analyzers 142, the simulation engine 144, and the data migrator 146 from the storage device 14 and execute the algorithm analyzers 142, the simulation engine 144, and the data migrator 146 to carry out the automated tiering method of the embodiment.

Figure 2:
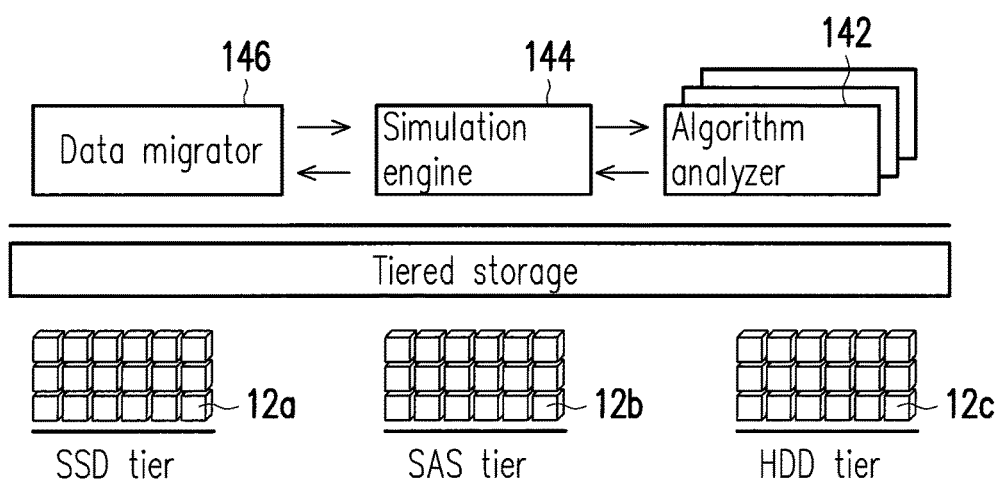
FIG. 2 is a schematic view illustrating a software framework of an automated tiering system according to an embodiment of the invention.

FIG. 2 is a schematic view illustrating a software framework of an automated tiering system according to an embodiment of the invention. Referring to FIG. 2, FIG. 2 illustrates the software framework of the storage system 10 shown in FIG. 1. The algorithm analyzers 142 respectively correspond to different system configurations, for example, and may relocate data blocks in the storage apparatuses 12 by adopting different algorithms to generate corresponding data allocation maps. The simulation engine 144 may, for example, generate an exploitation map of a current data block allocation of the storage apparatuses 12, calculate relocated data block allocations in the data allocation maps generated by all of the algorithm analyzers to generate the exploitation maps, and evaluate all of the exploitation maps to appoint the algorithm raising the most performance to be the best system configuration. Then, the data migrator 146 may start performing a data relocation optimizing process based on the best configuration appointed by the simulation engine 144. FIG. 2 also shows a tiered storage framework of the embodiment, where the storage apparatuses 12 are classified into a solid state drive tier (SSD tier) 12a, a serial attached small computer system interface drive tier (SAS tier) 12b, and a hard disk drive tier (HDD tier) 12c based on performance.

Figure 3:
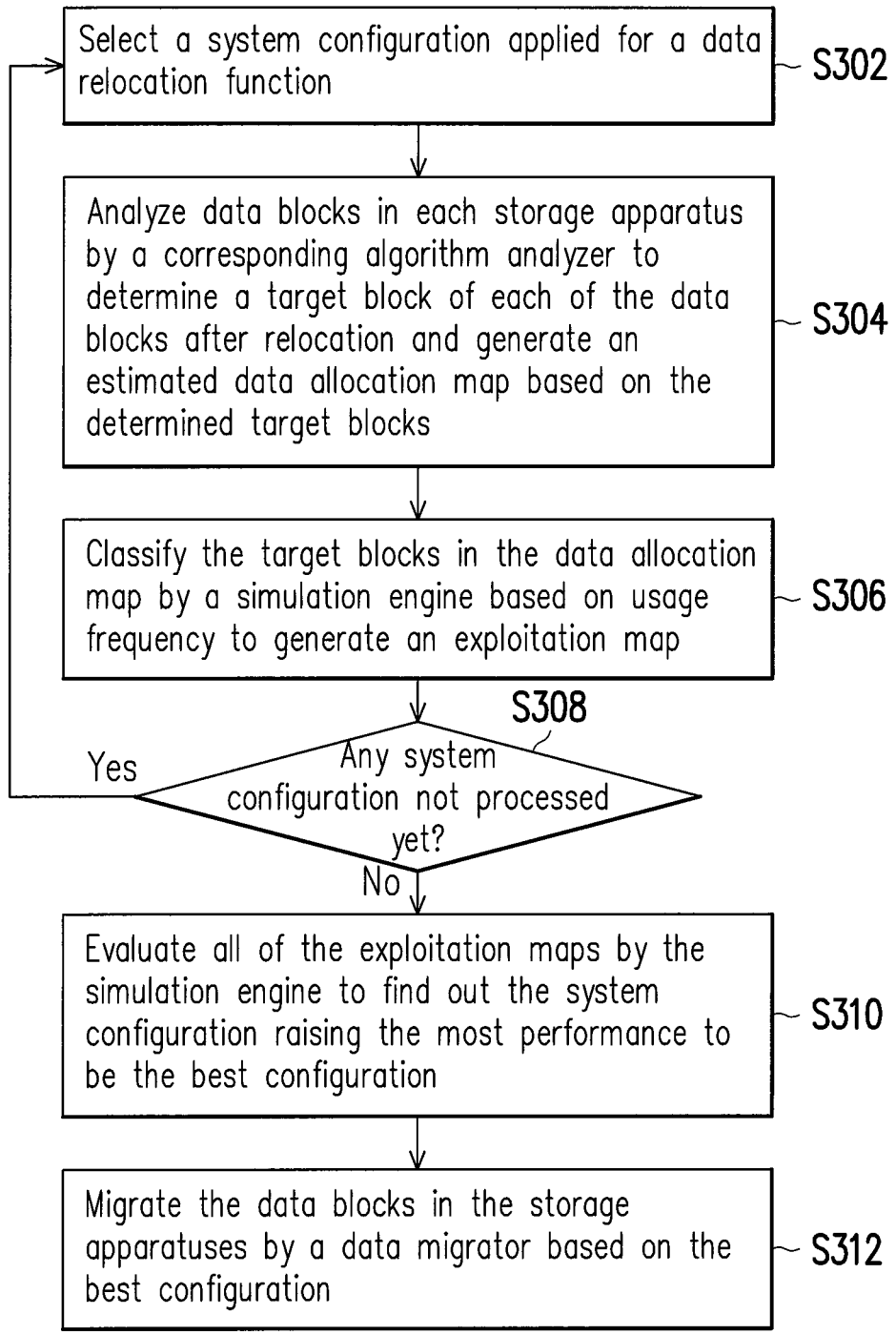
FIG. 3 is a flowchart illustrating an automated tiering method according to an embodiment of the invention.

FIG. 3 is a flowchart illustrating an automated tiering method according to an embodiment of the invention. Referring to FIGS. 1 and 3 together, the method of the embodiment is suitable for the storage system 10. In the following, details of steps of the automated tiering method according to the embodiment of the invention are described with reference to the respective components and elements of the storage system 10.

First of all, the controller 16 chooses one of a plurality of system configurations applied for a data relocation function (Step S302). Each of the system configurations includes a corresponding data relocation algorithm and an applicable system framework of the system configuration. The system framework includes the number of tiers of the storage apparatuses 12, the size of each tier, the specification of each tier, and/or the like. It should be noted that the invention does not intend to impose a limitation on this regard.

Then, the controller 16 executes the algorithm analyzer 142 corresponding to the chosen system configuration, analyzes the data blocks in each of the storage apparatuses 12 to determine a target block of each of the data blocks after relocation, and generates an estimated data allocation map based on the determined target blocks (Step S304).

Specifically, when the storage system 10 is accessed, each of the algorithm analyzers 142 may record a required input/output (I/O) characteristic, including one of the numbers of accessed times, read times, write times, random access input/output times, sequential access input/output times, and times of newly allocating a data block, or a combination thereof. Based on the statistical data collected in advance, the algorithm analyzer 142 analyzes the data blocks of each of the storage apparatuses 12 to determine the target blocks of relocation. In addition, the relocation includes tier promotion or tier demotion, and the data block is not limited to being migrated to an adjacent tier. In other words, the tier of the data block after migration may be an adjacent tier or a non-adjacent tier. Taking FIG. 2 as an example, a data block originally located at the HDD tier 12a may be moved to the adjacent SAS tier 12b or the non-adjacent SDD tier 12c.

Then, the controller 16 executes the simulation engine 144 to classify the target blocks in the data allocation map based on usage frequency, so as to generate the exploitation map (Step S306). The simulation engine 144 may generate the exploitation map for current data allocation of the storage apparatuses 12 and then calculate relocated data block allocations for the data allocation maps generated by all of the algorithm analyzers 142 to generate the exploitation maps, for example.

Specifically, the simulation engine 144 generates the exploitation map by, for example, determining classes of the data blocks based on the usage frequency of the respective data blocks (i.e., target blocks) and constructing the exploitation map based on the classes of the respective data blocks and locations of the respective data blocks in the respective tiers.

After the exploitation map is generated, the controller 16 may determine whether there is any other system configuration candidate not yet processed (Step S308). If the controller 16 determines that there is still a system configuration not yet processed, the flow may return to Step S302, where the controller 16 may choose another system configuration again to generate the corresponding data allocation map and the corresponding exploitation map. Alternatively, if the controller 16 determines that all of the system configurations are processed, the controller 16 may continue executing the simulation engine 144 to evaluate all of the exploitation maps and find out the system configuration raising the most performance as the best configuration (Step S310). For example, the simulation engine 144 may select the best configuration based on whether the data blocks having the highest usage frequency or having the highest scores fall within the highest tier (e.g., the SSD tier) or a proportion of such data blocks within the highest tier. The simulation engine 144 may also choose the best configuration by calculating a matching degree between each of the exploitation maps and a target allocation set in advance.

Specifically, in an embodiment, the simulation engine 144 may find out the target blocks in the tier with the best performance for each of the exploitation maps, and calculate a proportion of the number of the target blocks whose usage frequency of the class is greater than a predetermined frequency with respect to all the target blocks in the tier. Then, the system configuration corresponding to the exploitation map whose proportion is the highest is chosen to be the best configuration. In another embodiment, the simulation engine 144 may assign a corresponding score based on the usage frequency of each of the target blocks, the importance of the data stored in the target block, and/or other parameters, and then calculate the total of the scores of all of the target blocks in the tier with the best performance. Then, the system configuration corresponding to the exploitation map with the highest total of the scores is chosen to be the best configuration. In yet another embodiment, the simulation engine 144 may compare the allocation of the target blocks in each of the exploitation maps with a target allocation set in the storage system 10 or set by the user to find out the exploitation map most matching the target allocation and choose the system configuration corresponding to the exploitation map to be the best configuration. For example, the target allocation may include a maximum throughput allocation or a tier-averaged allocation. Nevertheless, it should be noted that the invention is not limited thereto.

Figure 4C:
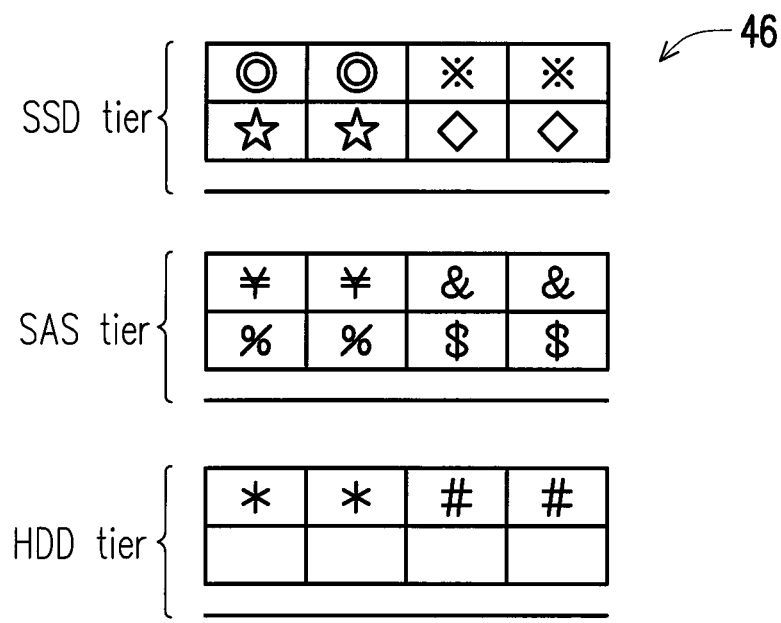

For example, FIGS. 4A to 4C are examples of exploitation maps according to an embodiment of the invention. Referring to FIG. 4A, the simulation engine 144 may classify all of the data blocks of the storage apparatuses 12 into ten classes based on usage frequency percentiles, and then construct an exploitation map 42 based on locations where the data blocks of the respective classes are arranged. In the exploitation map 42, the frequently used data blocks (including data blocks whose usage frequency percentiles fall within the intervals of 90-100, 80-90, 70-80, and 60-70) are all located at the tier with the lowest performance (i.e., the HDD tier). Thus, it is determined that the storage system 10 still has room for improvement.

Referring to FIG. 4B, FIG. 4B illustrates an exploitation map 44 generated by the simulation engine 144 after the data blocks of the storage apparatuses 12 are relocated by an algorithm A. In the exploitation map 44, the frequently used data blocks (including data blocks whose usage frequency percentiles fall within the intervals of 90-100, 80-90, 70-80, and 60-70) are promoted to the SAS tier from the HDD tier. Thus, it is expected that the performance of the storage system 10 may be raised.

Referring to FIG. 4C, FIG. 4C illustrates an exploitation map 46 generated by the simulation engine 144 after the data blocks of the storage apparatuses 12 are relocated by an algorithm B. In the exploitation map 46, not only the frequently used data blocks (including data blocks whose usage frequency percentiles fall within the intervals of 90-100, 80-90, 70-80, and 60-70) are directly promoted from the HDD tier to the SSD tier, the least accessed data blocks (including data blocks whose usage frequency percentiles fall within the intervals of 0-10 and 10-20) are also demoted to the HDD tier. Hence, it is expected that the performance of the storage system 10 may be raised even more. Lastly, the simulation engine 144 may choose one of the algorithm A and the algorithm B to be the best configuration, and provide the chosen algorithm to the data migrator 144 to start the data relocation optimizing process.

For example, the simulation engine 144 may calculate the proportion of the data blocks whose usage frequency is highest (e.g., including the data blocks whose usage frequency percentiles fall within the intervals of 90-100 and 80-90) in the highest tier (i.e., the SSD tier) in each of the exploitation maps 44 and 46, and choose the system configuration corresponding to the exploitation map 46 whose proportion is the highest. Here, the highest proportion is 0.5, for example. However, the highest proportion is not limited to 0.5, but may also be 0.4, 0.6, 0.8, or other proportions.

Back to the flow of FIG. 3, after the simulation engine 144 finds out the best configuration, the controller 16 may load the best configuration to the data migrator 146, and the data migrator 146 may migrate the data blocks in the storage apparatuses 12 based on the best configuration (Step S312).

According to the method, the storage system 10 according to the embodiment is able to find out the best system configuration and thereby raise the system performance while avoiding the time-consuming data relocation.

It should be noted that, in the storage system 10 of another embodiment, the respective algorithm analyzers 142 may generate the data allocation maps, and then the simulation engine 146 is started to generate the corresponding utilization maps based on the data allocation maps, thereby finding out the best configuration by evaluating the exploitation maps.

Figure 5:
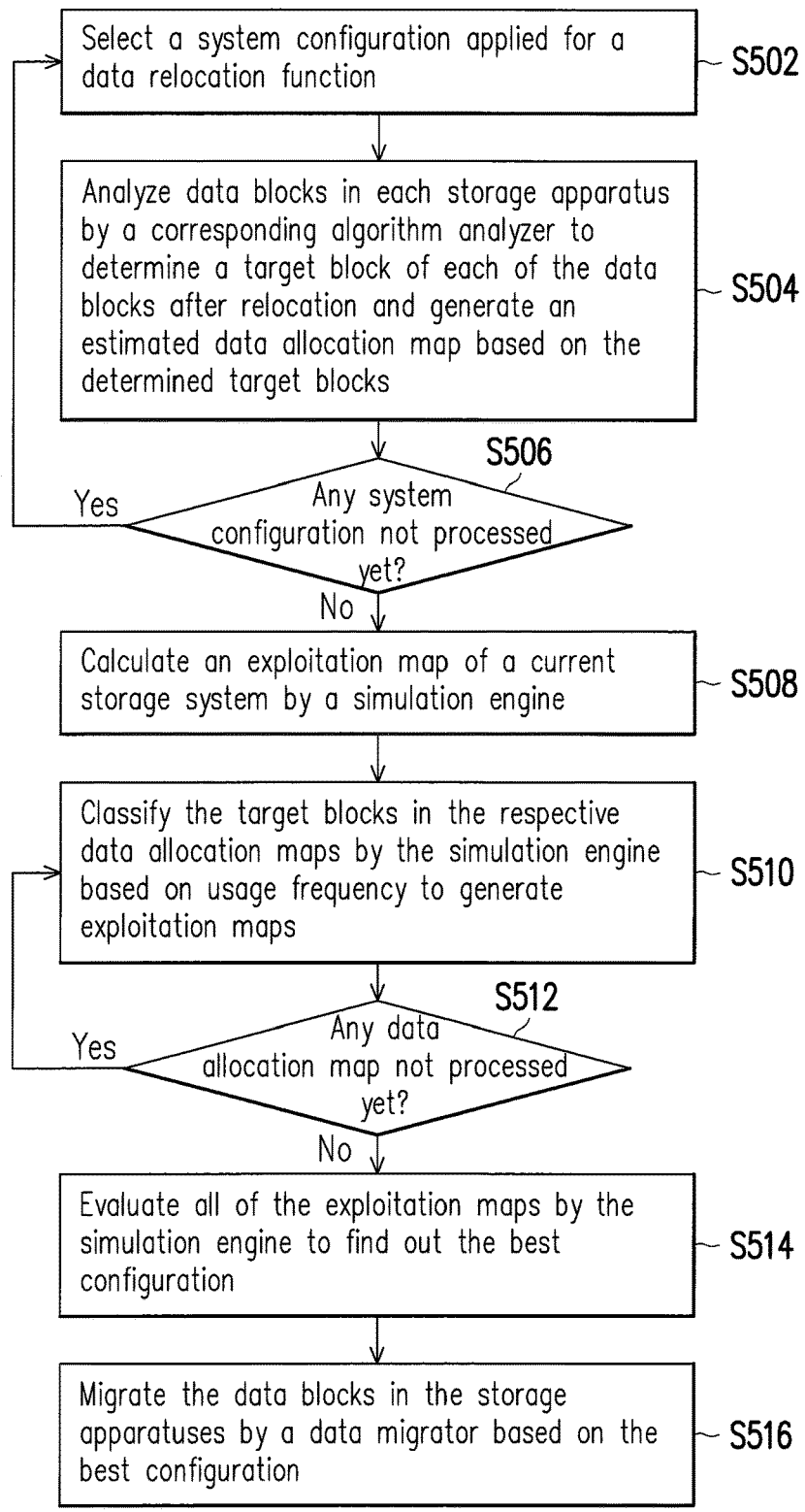
FIG. 5 is a flowchart illustrating an automated tiering method according to an embodiment of the invention.

To be more specific, FIG. 5 is a flowchart illustrating an automated tiering method according to an embodiment of the invention. Referring to FIGS. 1 and 5 together, the method of the embodiment is suitable for the storage system 10. In the following, details of steps of the automated tiering method according to the embodiment of the invention are described with reference to the respective components and elements of the storage system 10.

First of all, the controller 16 chooses one of a plurality of system configurations applied for the data relocation function (Step S502). Then, the controller 16 executes the algorithm analyzer 142 corresponding to the chosen system configuration, analyzes the data blocks in each of the storage apparatuses 12 to determine the target block of each of the data blocks after relocation, and generates the estimated data allocation map based on the determined target blocks (Step S504). Steps S502-S504 are the same as or similar to Steps S302-S304 in the previous embodiment, so the detailed contents will not be repeated in the following.

Different from the previous embodiment, in the embodiment, the controller 16 may further determine whether there is any other system configuration candidate not processed yet after each of the algorithm analyzers 142 generates the estimated data allocation map (Step 506). If it is determined that there is still a system configuration not yet processed, the flow returns to Step S502, where the controller 16 may choose another system configuration again to generate the corresponding data allocation map. Alternatively, if the controller 16 determines that all of the system configurations are processed, the simulation engine 144 is executed to calculate the exploitation map of the current storage system 10 (Step S508), such as the exploitation map 42 shown in FIG. 4A.

Then, the simulation map 144 may classify the target blocks in the respective data allocation maps generated by the algorithm analyzers 142 based on the usage frequency, so as to generate the exploitation maps (Step S510). After the exploitation maps are generated, the controller 16 may determine whether there is any other data allocation map not yet processed (Step S512). If the controller 16 determines that there is still another system allocation map not processed yet, the flow returns to Step S510, and the simulation engine 144 may classify the target blocks in the another data allocation map to generate the exploitation map. Alternatively, if the controller 16 determines that all of the data allocation plans are processed, the controller 16 may continue executing the simulation engine 144 to evaluate all of the exploitation maps and find out the system configuration raising the most performance as the best configuration (Step S514). Lastly, the controller 16 may load the best configuration to the data migrator 146, and the migrator 146 may migrate the data blocks in the storage apparatuses 12 based on the best configuration (Step S516). Details of implementing Steps S514 to S516 are same as or similar to those of Steps S310 to S312. Thus, details in this respect shall not be repeated in the following.

According to the method, the storage system 10 according to the embodiment is also able to find out the best system configuration and thereby raise the system performance while avoiding the time-consuming data relocation.

In view of the foregoing, in the automated tiering system and the automated tiering method according to the embodiments of the invention, data relocation results (i.e., the data allocation maps) in different configurations are simulated, and the exploitation maps are constructed based on the classes and locations of the respective data blocks in the simulated allocation results. Then, the best configuration is chosen by rating the exploitation maps. Accordingly, the embodiments of the invention are able to find out the best system configuration in advance and thereby optimize the performance of relocated data without consuming a significant amount of time for data relocation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An automated tiering system, comprising:
a plurality of storage apparatuses, layered into at least two tiers based on performance;
a storage device, storing a plurality of modules; and
a controller, coupled to each of the storage apparatuses and the storage device, and loading and executing the modules, wherein the modules comprise:
a plurality of algorithm analyzers, respectively corresponding to a plurality of system configurations applied for a data relocation function, wherein the algorithm analyzers are configured to analyze a plurality of data blocks in each of the storage apparatuses to determine a target block of each of the data blocks after relocation and generate an estimated data allocation map based on the determined target blocks;
a simulation engine, classifying the target blocks in the data allocation map generated by each algorithm analyzer to generate an exploitation map, and evaluating the exploitation map corresponding to each of the system configurations to determine a best configuration of the system configurations; and
a data migrator, migrating the data blocks of the storage apparatuses based on the best configuration determined by the simulation engine.

2. The system as claimed in claim 1, wherein the simulation engine comprises respectively tier-promoting or tier-demoting the data blocks to the target blocks, wherein the tier after migration of the respective data blocks comprises an adjacent tier or a non-adjacent tier.

3. The system as claimed in claim 1, wherein when the storage system is accessed, each algorithm analyzer records a required input/output characteristic, and analyzes the data blocks of each of the storage apparatuses by using the input/output characteristic, wherein the input/output characteristic comprises one of accessed times, read times, write times, random access input/output times, sequential access input/output times, and times of newly allocating a data block, or a combination thereof.

4. The system as claimed in claim 1, wherein the simulation engine comprises determining a class of the target block based on the usage frequency of each of the target blocks and constructing the exploitation map based on the classes of the respective target blocks and locations of the respective target blocks in the respective tiers.

5. The system as claimed in claim 1, wherein the simulation engine comprises finding out the target blocks in the tier with the best performance for each of the exploitation maps, calculating a proportion of a number of the target blocks whose usage frequency of the class is greater than a predetermined frequency with respect to a number of all of the target blocks, and choosing the system configuration corresponding to the exploitation map with the highest proportion as the best configuration.

6. The system as claimed in claim 1, wherein the simulation engine comprises assigning a corresponding score based on the usage frequency of each of the target blocks and importance of data stored in each of the target blocks, calculating a total of the scores of the target blocks in the tier with the best performance for each of the exploitation maps, and choosing the system configuration corresponding to the exploitation map with the highest total of the scores as the best configuration.

7. The system as claimed in claim 1, wherein the simulation engine comprises comparing an allocation of the target blocks of each of the exploitation maps with a predetermined target allocation to find out the exploitation map matching the predetermined target allocation and adopting the system configuration corresponding to the exploitation map as the best configuration, wherein the predetermined target allocation comprises a maximum throughput allocation or a tier-averaged allocation.

8. An automated tiering method, for a storage system having a plurality of storage apparatuses layered into at least two tiers and a controller, the method comprising:
choosing, by the controller, one of a plurality of system configurations applied for a data relocation function;
executing an algorithm analyzer corresponding to the chosen system configuration, analyzing a plurality of data blocks in each of the storage apparatuses to determine a target block of each of the data blocks after relocation, and generating an estimated data allocation map based on the determined target blocks by the controller;
classifying, by the controller, the target blocks in the data allocation map based on usage frequency, so as to generate an exploitation map;
repeating the steps by the controller to generate the data allocation map and the exploitation map corresponding to each of the system configurations;
evaluating the exploitation maps by the controller to find out the system configuration raising the most performance as a best configuration; and
executing a data migrator by the controller to migrate the data blocks in the storage apparatuses based on the best configuration.

9. The method as claimed in claim 1, wherein the step of determining the target block of each of the data blocks after relocation comprises:
respectively tier-promoting or tier-demoting the respective data blocks to the target blocks, wherein the tier after migration of the respective data blocks comprises an adjacent tier or a non-adjacent tier.

10. The method as claimed in claim 1, further comprising:
when the storage system is accessed, executing each algorithm analyzer by the controller to record a required input/output (I/O) characteristic, and analyzing the data blocks of each of the storage apparatuses by using the input/output characteristic, wherein the input/output characteristic comprises one of accessed times, read times, write times, random access input/output times, sequential access input/output times, and times of newly allocating a data block, or a combination thereof.

11. The method as claimed in claim 1, wherein the step of classifying, by the controller, the target blocks in the data allocation map based on the usage frequency to generate the exploitation map comprises:
determining a class of the target block based on the usage frequency of each of the target blocks; and
constructing the exploitation map based on the classes of the respective target blocks and locations of the respective target blocks in the respective tiers.

12. The method as claimed in claim 1, wherein the step of evaluating the exploitation maps by the controller to find out the best configuration of the system configurations comprises:
finding out the target blocks in the tier with the best performance for each of the exploitation maps, and calculating a proportion of a number of the target blocks whose usage frequency of the class is greater than a predetermined frequency with respect to a number of all of the target blocks; and choosing the system configuration corresponding to the exploitation map with the highest proportion as the best configuration.

13. The method as claimed in claim 1, wherein the step of evaluating the exploitation maps by the controller to find out the best configuration of the system configurations comprises:

assigning a corresponding score based on the usage frequency of each of the target blocks and importance of data stored in each of the target blocks;

calculating a total of the scores of the target blocks in the tier with the best performance for each of the exploitation maps; and choosing the system configuration corresponding to the exploitation map with the highest total of the scores as the best configuration.

14. The method as claimed in claim 1, wherein the step of evaluating the exploitation maps by the controller to find out the best configuration of the system configurations comprises:

comparing an allocation of the target blocks of each of the exploitation maps with a predetermined target allocation to find out the exploitation map matching the predetermined target allocation and adopting the system configuration corresponding to the exploitation map as the best configuration, wherein the predetermined target allocation comprises a maximum throughput allocation or a tier-averaged allocation.

* * * * *